Patented Aug. 4, 1931

1,817,865

UNITED STATES PATENT OFFICE

EDGAR ARTHUR ASHCROFT, OF WAYE HOUSE, NEAR ASHBURTON, ENGLAND

METALLURGY OF ORES OR MATERIALS CONTAINING TIN

No Drawing. Application filed May 7, 1928, Serial No. 275,971, and in Great Britain April 5, 1928.

This invention relates to improvements in the metallurgy of tin bearing ores or materials whereby the valuable contents thereof may be extracted in a more convenient and economical manner than heretofore.

It is useful in the treatment of ores, concentrates, slags, alloys, residues, or tin containing materials of almost any kind. Particularly it is useful in the extraction of tin from ores or concentrates containing it in the form of cassiterite such as the well known "lode tin" or "alluvial" ores which occur throughout the world, or of any form of concentrates therefrom.

My invention is characterized by the use of metal chlorides such as ferrous chloride or of zinc chloride to effect the chlorination of the tin contained in any of the aforesaid materials. And further by the use of a reducing agent in conjunction with such chloride or chlorides and further by the removal of the stannous chloride from the gangue matter by distillation or by lixiviation or both and by treating the produced chloride for the recovery of its tin and chlorine or treating the produced oxides or basic salts of zinc or iron for the regeneration of the chlorides of these metals. I may, on the other hand, both treat the produced chloride for the recovery of its tin and chlorine and treat the produced oxides or basic salts of zinc or iron for the regeneration of the chlorides of these metals.

I may procure the said zinc or iron chlorides from extraneous sources and so introduce them to the cycle of my process or I may regeneratively produce the said chlorides extraneously or in situ by the agency of ammonium chloride or by electrolysis or otherwise all as hereinafter described.

In carrying out my invention I may act on the cassiterite (or other tin compounds) in such ores or materials by means of a heat treatment step and mix the ore or material with a reducing agent for instance a metal in divided state, and a metal chloride. Preferably I use iron powder reduced by carbon, hydrogen, carbon monoxide, water gas or the like and ferrous chloride or zinc and zinc chloride, or one metal and another chloride.

Both metal and salt may be in suitable quantities to satisfy the following reaction— which I state empirically and not necessarily as describing accurately what takes place— or the analogous reaction when zinc or zinc chloride or zinc and zinc chloride are employed.

(1) 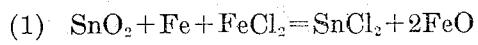  $SnO_2 + Fe + FeCl_2 = SnCl_2 + 2FeO$

I may carry out my process according to this reaction either with all the materials pulverized and the reacting chloride or chlorides in no great excess, or I may carry it out in fluid baths of the reacting chlorides particularly zinc chloride with or without admixtures of iron chlorides and accompanied by a simultaneous continuous or intermittent regeneration of the reacting chloride.

When operating in the former way the mixture of ore, metal powder and metal salt in a state of division equivalent to from 30 to 100 mesh may be placed in any suitable form of furnace or heating device with means for exclusion of air. The metal need not necessarily be in a fine state of division as reaction will take place even with moderately large pieces. But fine division is preferred when practicable.

On raising the temperature of the aforesaid mixtures uniformly to from 600 to 900 degrees centigrade, stannous chloride will form quantitatively and if the temperature is not raised too high the charge will remain open and pulverized and not be slagged or sintered. At 400° centigrade there is slow reaction, at 600° centigrade the reaction takes place freely, but is slower than at 700 or 800 degrees centigrade. At 850° centigrade it is very rapid and about this temperature or a little higher slagging or sintering of the gangue usually begins.

One very suitable device wherewith to carry out my process is a vertical steel retort with an opening leading to a condenser to distil off the product and a bottom and top to the retort capable of being opened to introduce and remove the charges and closed and sealed whilst heating is in progress. Having regard to the life of such retorts 700 degrees centigrade is a good temperature to work at. The iron of such retorts may function partially as reducing metal and if preferred I may provide them with renewable linings. The heat may be produced externally or internally by any suitable means and should be applied uniformly to all parts of the retort or charge. There should be present some excess of both reducing metal and reacting salt over that indicated by the empirical reaction stated above if complete reduction and chlorination of the tin is desired in one operation. The amount of excess required will depend on the amount of other iron or chlorine or iron and chlorine consuming constituents of the ore and must be found empirically for any given ore or material.

Instead of metals I may employ carbonaceous reducing agents for instance coal or charcoal preferably with some iron present to act as a catalyzer as explained in my copending application Serial No. 275,267, filed May 4, 1928.

The tin chloride thus formed in the interstices of the hot charge may be caused to distil downwards or upwards through the charge and to pass out almost quantitatively through a suitable opening provided for the purpose and may be caught in a condenser. It is wholly in the stannous form and being volatile at 620° centigrade and melting at 250° centigrade it is a most convenient material to deal with in the manner herein described.

It is also remarkably pure containing practically no iron and no arsenic and I may recover tin and chlorine (or hydrochloric acid) therefrom in a very efficient and economical manner by either of the methods hereinafter described.

Instead of iron I may employ the metal zinc as reducing metal and instead of iron chloride I may employ zinc chloride as reacting salt in the above stated reaction. Or I may employ either metal and the other chloride.

I may add to the charges in such retorts tin plate scrap—divided into as small pieces as may be convenient and well mixed with the charge—whereupon the tin of such scrap will be converted to chloride and recovered whilst the iron will function usefully as reducing metal.

Working in the above described manner and using proportions and ingredients of charge according to reaction (1) with an excess of 10 per cent each of iron and of iron chloride, I have obtained 92 per cent of the tin from a charge of only 200 grams of a Cornish ore containing only 1.17 per cent of tin in the form of a few grams of practically pure anhydrous stannous chloride condensed in the iron pipe outlet from the bottom of the retort. The charge in the retort then contained only 0.1 per cent of tin. By more careful work no doubt excellent recoveries from even the lowest grades of ore are possible. By using a richer concentrate, for instance one having 6 per cent to 10 per cent of tin, the recovery in my experiments reached 98 per cent.

When there is much tin present and when working as above described the greater part of it will pass out as liquid stannous chloride from the bottom or top of the retort and may be collected in liquid form.

If zinc chloride is employed in the charge as reacting salt the surplus chloride so employed—this salt being volatile alone at 735° centigrade—may be distilled out of the charge with the produced stannous chloride and condensed and collected therewith.

When there is little tin present I may if preferred, employ vessels or retorts without an outlet for the produced chloride which I may afterwards dissolve out of the charges with water and suitably treat the solutions.

Furthermore I may modify my process as follows in order to bring about the cyclic chemical regeneration of the reacting materials by the agency of ammonium chloride—which is regenerated and used cyclically—and of carbon all as indicated by the following supplementary reactions (2) (3) and (4) or otherwise as hereinafter described. Reaction (5) deals with the reduction of the pure stannous oxide to metal.

These reactions stated empirically may be written thus (2) $2FeO + C = CO_2 + 2Fe$ (Practically complete at 500° centigrade, some CO formed and proportionately more carbon required according to temperature)

(3) $2Fe + 2NH_4Cl = Fe + FeCl_2 + 2NH_3 + H_2$ (Complete at 250° centigrade as to half and 350° centigrade to 2nd half).

(4) $SnCl_2(Aq) + 2NH_3 = 2NH_4Cl + Sn(OH)_2$ (takes place in solution at room temperature).

(5) $Sn(OH)_2 + \frac{1}{2}C = Sn + H_2O + \frac{1}{2}CO_2$ (At any temperature from about 400° centigrade upwards. Some $CO_2$ formed increasing as temperature is lower).

There is a by product of pure hydrogen gas from reaction (3) of some volume and value.

Having carried out the principal reaction (No. 1 hereinbefore described) and after distilling off or removal by lixiviation of the tin chloride, the residue containing all the iron first used—now as ferrous oxide—may be heated to about 500° centigrade with about 15 per cent of its weight of charcoal or any good coal and cooled out of contact with air. At this point the gangue may be discarded by taking out the iron magnetically or by simple washing and the iron returns to the process for reaction No. 3. The discarded gangue may be washed with slightly acidulated water if necessary to recover any adhering tin chloride.

In the case of very low grade tin bearing materials it may be convenient to recover all the tin chloride by lixiviation instead of by volatilization and I may do so without departing from my invention.

The reduced iron may now be mixed with half its equivalent of ammonium chloride and may be placed in an iron retort and heated to 350° centigrade when the ammonia will be driven off and may be collected in water or in any suitable manner and a mixture of equal equivalents of Fe and $FeCl_2$ remains as shewn in reaction (3).

That mixture is incorporated with its equivalent of cassiterite in the material to be treated and the cycle is repeated in reaction (1) et seq.

Instead of carrying out the three reactions (1) (2) and (3) as above noted as separate operations the whole may be performed in one retort at one time and as one continuous operation thus:—

Beginning with two ton molecules (or molecular equivalents) of finely divided "reduced" iron there is mixed therewith one ton molecule of charcoal, two ton molecules of ammonium chloride and the ore to be treated in the proportion of one ton molecule of its stannic oxide content.

The charge as first incorporated will thus consist of 112 tons of iron, 12 tons of coal or charcoal—more or less—106 tons of ammonium chloride and—if a concentrate of 60 per cent Sn content is under treatment—198 tons of concentrate containing 119 tons of tin. If a material of only 10 per cent Sn content is to be treated the ore charge will be 1190 tons for the same quantities of the other ingredients and of the metal to be extracted.

After reducing to a fineness of from 50 to 100 mesh and mixing well, the charge may be placed in any convenient apparatus, e. g. such iron retorts as I have hereinbefore described. The retorts should be provided with outlets for ammonia and steam and condensing apparatus therefor as well as outlets for distilled stannous chloride and condensing apparatus therefor. Also end doors for charging and discharging and a quenching tank wherein the residues may be cooled to prevent oxidization—and washed to free them from any tin chloride retained. The quenching solution may be a nearly saturated slightly acid solution of ferrous chloride and the residual tin chloride will be for the most part decomposed and precipitated as spongy metal in this hot solution by some of the finely divided iron. This tin together with the remainder of the metallic iron from the treated and quenched charge may be washed free from ferrous chloride and solution and separated from the gangue matter by magnetic or gravity or magnetic and gravity apparatus and the iron may go back into the next charge with the addition thereto of another ton molecule each of carbonaceous reducing agent and of tin bearing material and of all the recovered ammonium chloride.

The heating of the iron retorts may be conducted in stages and carefully regulated. At 150 to 200 degrees centigrade about half the ammonia present in the form of ammonium chloride is set free with the formation of double chlorides of iron and ammonium and at 300 to 350 degrees centigrade the double chlorides break up and the remainder of the ammonia is set free whilst the whole of the chlorine goes to form iron chloride. In this manner the chlorine introduced as ammonium chloride is transferred to and held bound by the iron until at the higher temperatures later reached in the retort it is able to combine with the tin.

A molecular equivalent of hydrogen is liberated at these stages of the reaction and a part of it will again reduce to metallic iron any oxidized iron which may be in the charge—due to the washing, drying etc.,—and some direct reduction of stannic oxide will also occur by the nascent hydrogen. The last named reaction is however slow at temperatures so low as 350 degrees centigrade. The remaining hydrogen escapes as gas and may be collected. It is nearly pure and may be utilized in many ways. The charcoal at these temperatures is almost inert.

When all the ammonia has been driven off the temperature is raised and the reaction then takes place between the ferrous chloride and the stannic oxide and the iron as shown in the principal reaction (1) and almost simultaneously the produced ferrous oxide is again reduced to iron by the charcoal, with formation of $CO_2$ (and some CO) as shown in reaction (2).

At 600 to 650 degrees centigrade these reactions are rapid and sufficiently complete. The stannous chloride begins to distil over at 620° centigrade. The escaping remnants of $CO_2$ and CO assist the disengagement of the vapourized stannous chloride and in general it is unnecessary to raise the temperature of the retorts beyond 650 to 700 degrees centigrade.

After the stannous chloride ceases to come off the retorts may be allowed to cool a little and the still hot residues pushed out into the quenching tanks.

The retorts may then be cooled a little further and recharged with the same mixture thus commencing a new cycle as before described—and so on.

The total variation in the heat of the retorts when at a minimum for charging and a maximum for distillation may thus be about 400° centigrade, i. e. from 300 to 700 degrees centrigrade. This is a convenient range and a bank of retorts may be so set as to be heated in two halves with reversible flues so that the hottest gases pass first round one half set and afterwards round the other interchangeably according to which stage of the heat is being conducted in the alternate halves of the retort settings.

Instead of carrying out reactions (4) and (5) as above noted the product of pure stannous chloride from either form of my herein described process may whenever preferred be electrolyzed, electrolytic recovery of the tin and chlorine being practicable either in the fused or in the solution state. The energy required is less than half a kilowatt hour per lb. of tin when using the fusion method and somewhat more than one kilowatt hour with the solution method with insoluble anodes.

Another method which has much to recommend it is to precipitate the tin in molten condition from a fused melt of the chloride by the use of pure zinc which is afterwards recovered by electrolyzing the pure anhydrous zinc chloride resulting from this reaction in molten condition.

This reaction is (6) 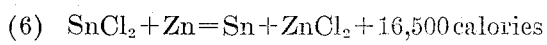 $SnCl_2 + Zn = Sn + ZnCl_2 + 16,500$ calories and the energy required is a little more than half a kilowatt hour per lb. of tin—i. e. 1 kilowatt hour per lb. of zinc used and recovered.

In either case the chlorine is caused to recombine with the ammonia from reaction (3) and one atom of hydrogen and regenerates the ammonium chloride required to maintain the cycle.

I may also modify my process as follows whereby the use of ammonia or its chloride is eliminated from the cycle entirely whilst I am still able to use the chlorine cyclically. In this form of my process, having carried out reaction No. (1) as hereinbefore described I may dissolve the stannous chloride product or distillate in any suitable electrolytic bath for instance in a nearly saturated and acidulated solution of ferrous chloride in water which may contain for instance about 100 grams per litre ferrous chloride, 20 to 50 grams per litre of tin as stannous chloride, 10 to 50 grams per litre free hydrochloric acid with small addition of gelatine glue or like reagents for improving the cathode deposit in known ways.

I may then electrolyze this solution using cathodes of sheet metal and anodes whose principal soluble constituent may be iron. The anodic iron combines with the chlorine depolarizes the bath and prevents the formation of stannic or ferric chlorides and the equivalent of ferrous chloride is produced and goes into solution.

From time to time portions of the produced ferrous chloride may be removed by evaporation or crystallization from the electrolyte and such ferrous chloride may be employed cyclically for the chlorination of further quantities of tin bearing material together with an equivalent of iron powder (or other reducing agent) according to reaction No. (1) hereinbefore described.

As ferrous-ammonium chloride crystallizes from such solutions very readily, I may carry a suitable proportion of ammonium chloride in the said electrolytes and utilize the double ammonium-iron salt as the chlorinating reagent in lieu of either ferrous chloride or ammonium chloride alone. The charges should then be suitably proportioned on the basis of the chlorine content of the salt, and the produced ammonia may be recombined with chlorine from ferrous chloride to form ammonium chloride and ferrous oxides or utilized in any other way as may be preferred either cyclically or otherwise.

The iron anodes aforesaid and the required iron powder for the reaction No. (1) may both be reduced and fabricated from the iron oxide product of said reaction and thus all the iron employed may be used cyclically or I may if preferred use for the anodes ordinary cast wrought or scrap iron or agglomerated fused or welded anodes fabricated from any waste materials containing iron and sometimes tin also e. g. scrap tinned plate may be fabricated into anodes or tin iron alloys known as "hard head" may be employed whereby both tin and iron may be recovered in useful forms from such materials.

By employing this modification of my process I am able to recover the tin from the stannous chloride solution with a very small consumption of electric energy due to low terminal voltage and absence of polarization or of free chlorine at the anodes. The energy required for the aforesaid electrolytic baths is less than 0.25 kilowatt hours per lb. of tin recovered. The process in this form is therefore highly economical. The cost of providing or fabricating the iron for the aforesaid anodes is comparatively small.

In carrying out the aforesaid reactions I may prepare a bath of fused zinc chloride with or without iron chloride in admixture and having provided a covered containing vessel with means of stirring the melt I may introduce thereto the material to be treated in company with any suitable reducing agent which may in this case conveniently be molten zinc or zinc powder.

The bath may be maintained at about 700° centigrade and the tin chloride which forms may be allowed to distil off and be collected. The melt will become basic by the formation of oxide of zinc.

Chlorine or hydrochloric acid may now be passed into the melt and will neutralize it forming zinc chloride. A portion of the zinc chloride may from time to time be removed and treated in known ways for instance by electrolysis in a state of fusion for the recovery of zinc and chlorine both of which may be returned to the process and used cyclically. Iron may be used in place of zinc in these reactions which are identical with those first herein described but zinc metal and zinc chloride are preferred in this form of my process. All the aforesaid reactions when using zinc and zinc chloride are exothermic so that it becomes unnecessary to supply external heat to the apparatus the heat of the cycle being self supporting.

The chlorine or hydrochloric acid may be passed into the melt intermittently or continuously whilst the melt is maintained at about 650 to 700 degrees centigrade and agitated with the reducing agent. Water gas or hydrogen gas in company with chlorine may be introduced to the melt simultaneously in lieu of hydrochloric acid gas and the carbon monoxide and any excess hydrogen in such gases will act as efficient reducing agents also. If iron is employed as reducing agent in this form of my process the produced iron oxide may be recovered by settling and lixiviating portions of the melt and reducing the recovered iron oxide to metal powder in known ways.

The last named form of my process is especially useful in the treatment of complex ores containing tin in association with other metals such as zinc and lead which may for instance occur as sulphides or as sulpho stannates associated with cassiterite and iron pyrites. The sulphide and sulpho stannates in such case may be decomposed by passing in chlorine gas to the melt in the known way and the sulphur distilled off, whilst the tin also is allowed to distil over as chloride and may be collected either with the sulphur or— by suitably regulating the temperature by governing the inflow of gas—separately.

Small incidental losses of iron, chlorine, and ammonia such as take place accidentally in all cyclic processes are in this one very cheaply replaced whichever form of my process is employed. The iron and chlorine required for the principal reaction either in the entire amounts or to replace losses when they are cyclically used and regenerated may be replaced in the form of ferrous chloride which is often obtainable from galvanizers or tin platers, spent pickle or from other wastes and the ammonia is obtainable from gas works liquor or from galvanizers' skimmings, and likewise crude zinc chloride. None of these materials are required to be in a state of purity and are therefore low priced.

As all the residues go back in to the process—except the discarded gangue matter— there is little or no opening for losses of tin and the recoveries indicated by experiment are almost complete. There is also no usage of materials except the aforesaid incidental losses—made good from waste materials— and the aforesaid molecular equivalent of charcoal (or coal) to be added to the charge at each cyclic round or used in the separate reduction of the iron oxide.

Many tin bearing ores contain arsenic in the form of arsenical pyrites in valuable amounts. The arsenic in concentration follows the tin and may be recovered from the ore or from concentrated tin products in any known or suitable ways, for instance it may be sublimed and recovered as fume by roasting the ore or concentrate in the known way before or after applying the herein described method of recovery of the tin.

During the herein described treatment of the ore the arsenic remains in the arsenious state and is not volatilized with the tin chloride or if any distils over it is quickly thrown out of the solutions as metal or as sulphides as when the stannous chloride is dissolved in water.

Throughout this specification the terms ore or material are intended whenever applicable by the context to include any ore concentrate product slag residue or other material from which tin is to be extracted. The terms furnace or retort are intended to include retorts horizontal sloping or vertical muffle or open furnaces with or without rabbling devices, revolving furnaces kilns tunnel ovens or any form of heating apparatus the heat for which may be supplied by solid, liquid or gaseous fuel or by electricity.

I do not confine my invention to the precise quantities or proportions of ingredients which I have indicated by way of example or illustration but may vary the same in any suitable manner and to suit any particular case without departing from the fundamental principles of my invention.

I am aware that carbonaceous and gaseous fuels have been frequently employed to reduce tin oxides both alone and in conjunction with various chlorinating agents such as chlorine or hydrochloric acid gas. I am also aware that zinc vapour at a high temperature has been used to reduce cassiterite in the assay of tin in ores.

I do not claim either of these reactions per se.

What I claim is:—

1. In the treatment of tin-bearing materials, the step of reducing and chlorinating the tin content of such materials by means of iron powder and a metal chloride.

2. In the treatment of tin-bearing materials, the step of reducing and chlorinating the tin content of such materials by means of iron powder and ferrous chloride.

3. In the treatment of tin bearing materials the steps of adding iron oxide and carbon to the tin bearing material, producing iron in situ by reducing said iron oxide with said carbon and then reducing and chlorinating the tin content of the tin bearing material by means of said iron and a metal chloride.

4. In the treatment of tin bearing materials the steps of adding powdered iron oxide and charcoal to the tin bearing material, producing iron in situ by reducing said powdered iron oxide with said charcoal and then reducing and chlorinating the tin content of the tin bearing material by means of said iron and a metal chloride.

5. In the treatment of tin bearing materials the steps of adding iron oxide and carbon to the tin bearing material, producing iron in situ by reducing said iron oxide with said carbon, and then reducing and chlorinating the tin content of the tin bearing material by means of said iron and a ferrous chloride.

6. In the treatment of tin bearing materials the steps of adding powdered iron oxide and charcoal to the tin bearing material, producing iron in situ by reducing said powdered iron oxide with said charcoal, and then reducing and chlorinating the tin content of the tin bearing material by means of said iron and a ferrous chloride.

In testimony whereof I have signed my name to this specification.

EDGAR ARTHUR ASHCROFT.